United States Patent [19]

Labranche

[11] Patent Number: 5,607,171
[45] Date of Patent: Mar. 4, 1997

[54] RECUMBENT BICYCLE

[76] Inventor: Gérard Labranche, 75 Grande Côte, Rosemère, Québec, Canada, J7A 1H1

[21] Appl. No.: 489,371

[22] Filed: Jun. 12, 1995

[51] Int. Cl.⁶ .................................................. B62K 17/00
[52] U.S. Cl. ........................ 280/288.1; 280/238; 280/260; 280/270; 280/278; 280/287; 280/293
[58] Field of Search ...................... 297/DIG. 3; 280/236, 280/238, 259, 260, 263, 270, 274, 278, 281.1, 287, 288.1, 288.2, 288.4, 293

[56] References Cited

U.S. PATENT DOCUMENTS

| | | | |
|---|---|---|---|
| 3,680,918 | 8/1972 | Briggs | 297/456 |
| 4,283,070 | 8/1981 | Forrestall et al. | 280/288.1 X |
| 4,502,705 | 3/1985 | Weaver | 280/234 X |
| 4,659,098 | 4/1987 | Jacobson | 280/288.1 |
| 4,781,413 | 11/1988 | Shumack, Jr. | 297/252 |
| 4,925,202 | 5/1990 | Barker | 280/263 X |
| 5,267,767 | 12/1993 | Farrow | 280/288.2 X |
| 5,388,847 | 2/1995 | Trammell, Jr. | 280/215 |
| 5,419,574 | 5/1995 | Krumm | 280/288.1 X |

FOREIGN PATENT DOCUMENTS

| | | | |
|---|---|---|---|
| 863253 | 3/1941 | France | 280/287 |

Primary Examiner—Brian L. Johnson
Assistant Examiner—Victor E. Johnson

[57] ABSTRACT

A recumbent bicycle including a frame having a longitudinal main tube divided into a main tube front section telescopically inserted into a main tube rear section to form an adjustable length frame. A forked yoke is pivotally fixed to the main tube front section. A front wheel is rotatably mounted on the yoke. A rear wheel is rotatably fixed to the main frame adjacent the frame rear end. A pedal assembly of a driving mechanism for driving the rear wheel is mounted on the main tube front section adjacent the frame front end. A seat and a handle assembly are mounted on the main tube rear section adjacent the frame rear end. A linkage rod operatively connects the handle assembly and the front wheel yoke. The linkage rod is preferably slidably mounted on a central member of the handle assembly allowing a user to modify the steering ratio between the rotation of the handlebar assembly and the corresponding rotation of the front wheel yoke. The seat is provided with inflatable air bags that modify the contour and consistency of various seat sections. A pair of crash bars extends laterally from the frame adjacent the handlebars preventing the handlebars from coming into contact with the ground surface upon a sideward tilt of the bicycle. The driving mechanism includes a pair of chain and sprocket assemblies which are connected in series through a common intermediate sprocket axis. A windshield is mounted adjacent the frame front end.

19 Claims, 9 Drawing Sheets

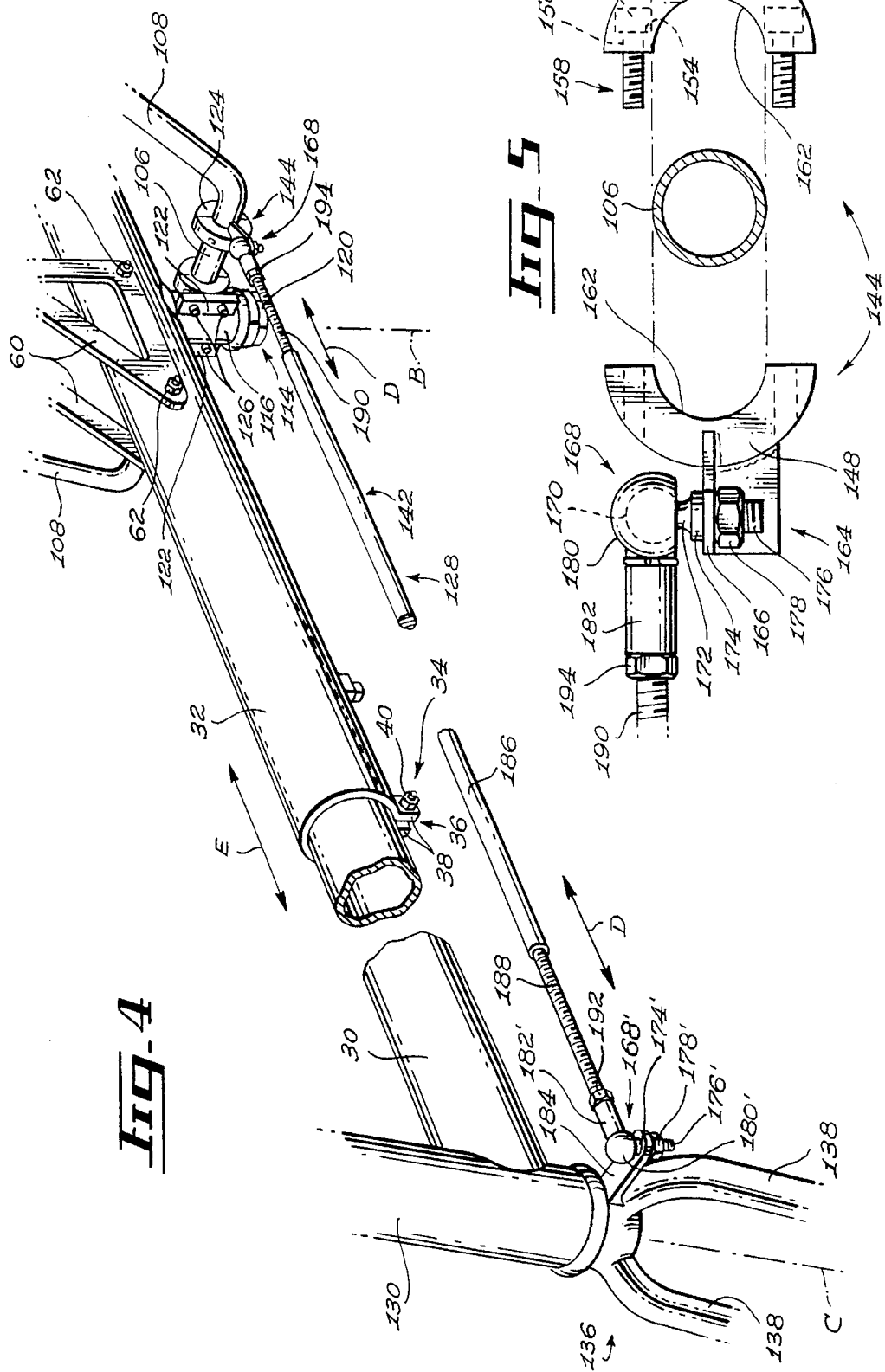

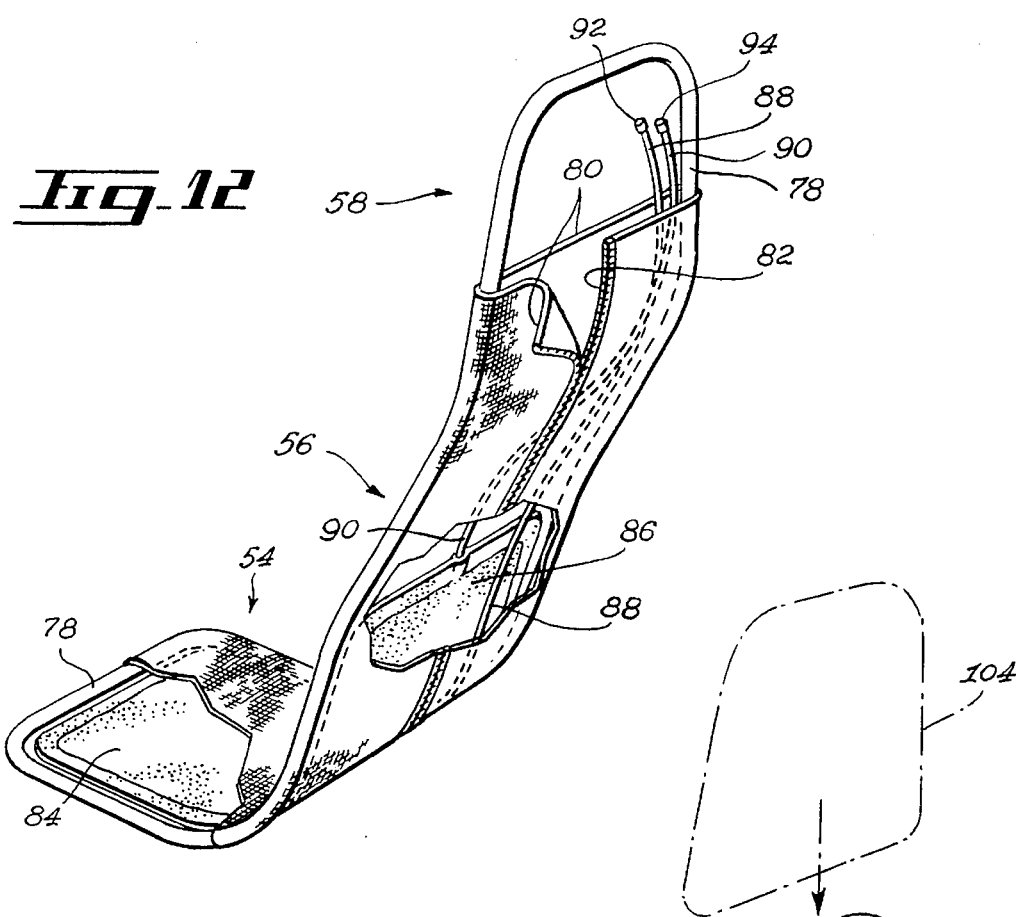
Fig. 12
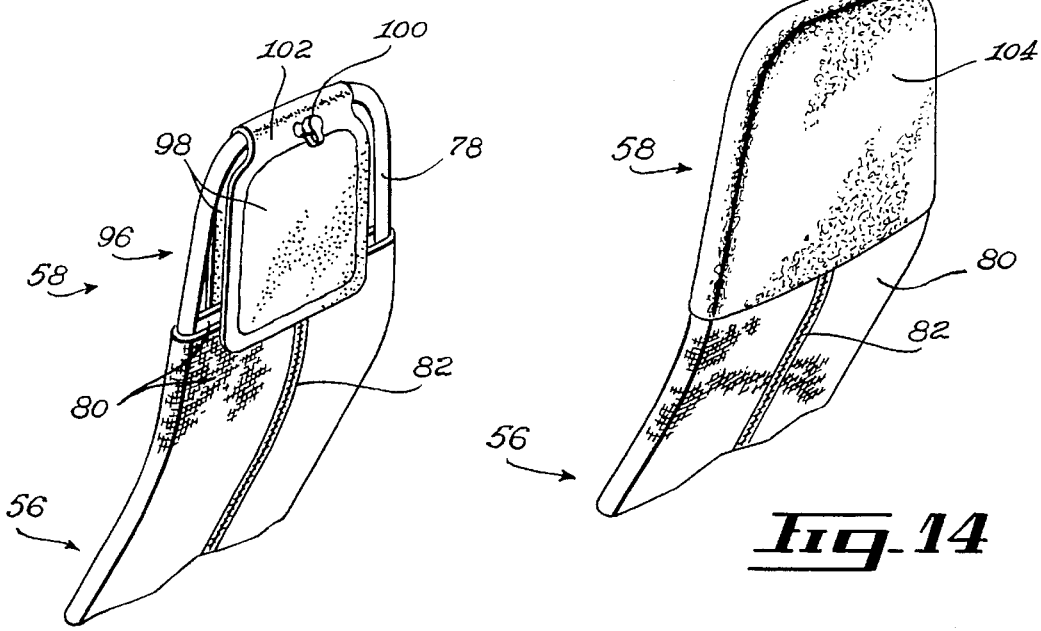
Fig. 13
Fig. 14

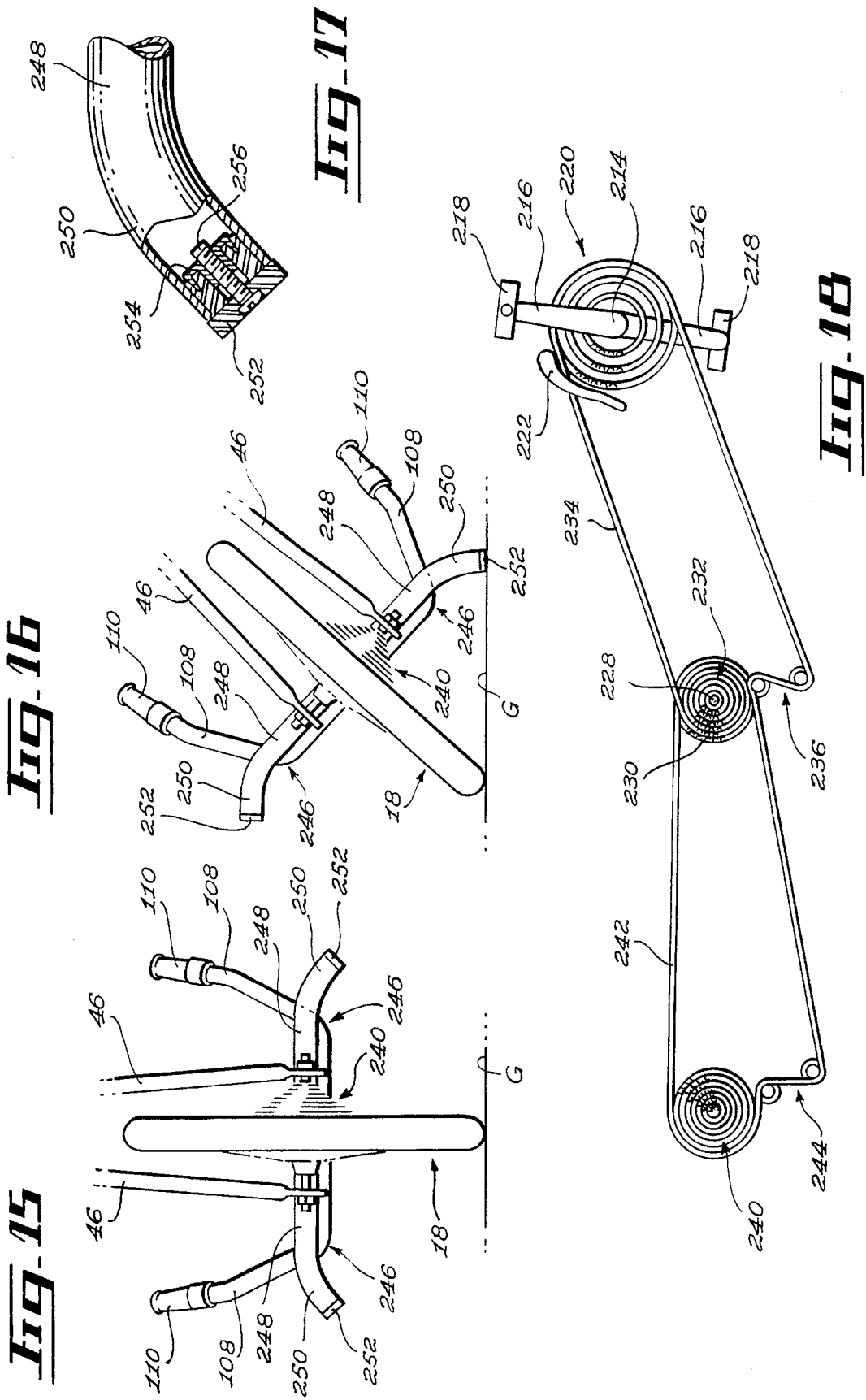

RECUMBENT BICYCLE

FIELD OF THE INVENTION

The present invention relates to the field of recumbent bicycles and is particularly concerned with a recumbent bicycle having an adjustable frame, an adjustable steering ratio, an adjustable gear ratio and various ergonomic features.

BACKGROUND—PRIOR ART

Bicycles have become a common mode of human-powered transportation. In conventional so-called upright bicycles, such as the multi-speed racing bicycles and the mountain style bicycles, the seat is positioned between and above the wheels while, the pedal assembly is positioned essentially vertically downward from the seat.

The conventional so-called upright bicycles suffer from a set of drawbacks. One of the main drawbacks associated with the so-called upright bicycles is that a relatively high proportion of the effort expanded by the rider is used to overcome wind resistance.

Another drawback of the conventional upright bicycles relates to the fact that the rider sits relatively high away from the ground and that in the event that a high degree of deceleration is achieved, the rider may be projected forwardly. Furthermore, hard braking can also lead to severe skidding of the tires.

A still further drawback of the conventional so-called upright bicycles is the general lack of ergonomic characteristics associated with the rider's position.

In order to circumvent the above mentioned disadvantages, another type of bicycle has evolved throughout the years, namely the so-called recumbent bicycle. The recumbent bicycles differ from the conventional upright bicycles in that the rider sits behind the foot pedals in a recumbent or reclining position on a seat that is usually provided with a backrest.

Unlike in an upright bicycle in which the rider's legs extend generally downwardly, in a recumbent bicycle, the rider's legs extend forwardly substantially parallel to the ground. As such, the combined frontal area of a recumbent bicycle and the rider is typically substantially less than in a conventional upright-type bicycle, thus causing less wind resistance.

Furthermore, the lower center of gravity and feet forward riding position mean that a high degree of deceleration can be achieved without the rider being projected forward. The risk of injury to the body due to contact with the handlebars, brakes and gear shift levers is reduced in the event that the rider is thrown forward. The feet being positioned in front of the rider, they are most likely to make contact in a head on collision, often bracing the rider and preventing substantial injury.

Moreover, during pedalling, the loads applied to the rider's body against the seat in reaction to the forces applied to the foot pedals by the rider's legs are transmitted to the seat through the hips and shoulders of the rider. This enables the upper torso and arms of the rider to remain relaxed while full power is being applied to the foot pedals.

Furthermore, the seat of a recumbent bicycle typically supports more of the rider's body area, including his back, so that the weight of the rider is distributed over a larger surface for greater comfort. Also, the recumbent position allows for greater thrust power since the back of the rider can be braced against the seat.

Although the recumbent bicycles generally present major advantages over the conventional upright bicycles, some of the prior art recumbent designs suffer from a set of drawbacks.

A first subset of drawbacks is related to the fact that in some of the prior art recumbent bicycles, the position of the seat is relatively fixed with respect to the position of the pedals. Consequently, various sized frames are required for different sized riders. This, of course, affects the bicycle manufacturing cost as well as the inventory requirements of both bicycles' suppliers and retailers.

In U.S. Pat. No. 4,878,684, issued Nov. 7, 1989, Eugene W. Lemle addresses the problem of using different sized frames for different sized riders by proposing a recumbent bicycle having a seat that can be quickly repositioned on the frame so as to provide for an adjustable spacing between the seat and the pedal assembly.

Although the solution thought by U.S. Pat. No. 4,878,684 solves the problem of providing various sized frames to accommodate various sized riders, it creates a set of new drawbacks. Indeed, in order to accommodate riders of all sizes, manufacturers resort to building relatively long frames so that riders having relatively long legs can be properly positioned by using the frame to its full length, while smaller sized riders are accommodated by moving the seat frontwardly on the relatively long frame towards the pedal assembly. The resulting effect is that medium sized and smaller sized riders must resort to using an oversized frame designed to accommodate larger sized riders.

The medium sized and smaller sized riders are thus forced to use an oversized frame that affects some important riding characteristics. The oversized length of the frame affects the capacity of the recumbent bicycle to corner a relatively tight curve. This can prove to be a particularly important problem in urban areas wherein relatively tight curves are quite frequent.

Another problem associated with the re-positioning of the seat on the frame relatively to the pedal assembly is that the weight distribution and the overall geometry of the bicycle are changed dramatically, thus affecting the overall stability of the recumbent bicycle.

Another disadvantage of changing the overall weight distribution and geometry of the bicycle is that the steering geometry and thus the steering "effect" of the bicycle is different than that which the rider is typically accustomed to.

Another drawback associated with the use of an oversized frame is the difficulty for smaller riders to mount unto the bicycle and to dismount from the latter.

A still further problem related to the re-positioning of the seat relatively to the pedal assembly is that the re-positioning of the seat also necessitates a re-positioning of various other components such as the handlebars, the brake levers and the gear shift levers.

A second subset of drawbacks frequently encountered with prior art recumbent bicycles, whether of the adjustable type or not, is related to the lack of ergonomic design of the seat. Since, as mentioned previously, the reaction to the thrust power on the pedals is applied against the back of the rider by the seat, the seat, if not designed properly, can lead to various injuries, especially in the lumbar region.

A third set of drawbacks associated with various prior art recumbent bicycles is that being positioned relatively close to the ground, some of their structural components are susceptible of contacting the road surface when the bicycle is sidewardly tilted during the cornering of a curve.

A fourth set of drawbacks associated with most conventional recumbent bicycles, especially bicycles wherein the seat may be re-positioned relative to the pedal assembly, is that they are mechanically complex and thus difficult to assemble and disassemble and thus are not adapted to be readily disassembled for storage and transportation.

A fifth set of drawbacks associated with most conventional recumbent bicycles is that since the gear shifting mechanism is positioned relatively close to the road surface, relatively small gear systems have been used so as to minimize the risk of the gear systems coming into contact with the ground surface when the vehicle corners a curve. Consequently, most prior art recumbent bicycles are not provided with a large gear ratio.

There is therefore a need for a recumbent-type bicycle that would be adaptable to various sized riders, while not presenting the drawbacks associated with using an oversized frame. A recumbent-type bicycle offering various ergonomic features such as an ergonomic seat and a high gear ratio is also highly desirable.

SUMMARY OF THE INVENTION

Accordingly, it is an object of the present invention to provide an improved recumbent bicycle.

In accordance with one aspect of the present invention, there is provided a recumbent bicycle comprising a substantially elongated frame defining a frame longitudinal axis, a frame front end and a frame rear end, the frame including a main tube, the main tube having a main tube front section and a main tube rear section, the main tube front section and the main tube rear section being movable relatively to one another along the frame longitudinal axis so as to vary the length of the frame, a forked yoke pivotally fixed to the main tube front section for pivoting about a yoke pivoting axis, a front wheel rotatably mounted on the yoke for rotating about a front wheel rotating axis, a rear wheel rotatably fixed to the frame adjacent the frame rear end for rotating about a rear wheel rotating axis, a driving mechanism for driving the rear wheel, the driving mechanism including a pedal assembly, the pedal assembly being mounted on the main tube front section adjacent the frame front end, a seat mounted on the main tube rear section adjacent the frame rear end, a handle assembly pivotally mounted on the main tube rear section adjacent the seat, a linkage means for transmitting the rotation of the handle assembly to the yoke, the linkage means being operatively attached to both the handle assembly and the yoke, a brake means mounted on the frame for braking the bicycle.

Preferably, the handle assembly includes a handlebar central member pivotally fixed to the main tube rear section in a substantially perpendicular relationship with the latter for rotation about a generally vertically extending steering axis, the linkage means including a substantially elongated linkage rod, the linkage rod having a linkage rod first end and a linkage rod second end, the linkage rod first end being pivotally attached to the yoke by a linkage rod first connecting means, the linkage rod second end being pivotally attached to the handlebar central member by a linkage rod second connecting means, the linkage rod second connecting means being movable along the handlebar central member so as to vary the amount of turning of the handle assembly required to pivot the front wheel about the yoke pivoting axis.

Conveniently, the linkage rod first connecting means and the linkage rod second connecting means include a ball and socket-type of joint.

Preferably, the linkage rod second connecting means includes a connecting ring, the connecting ring being slidably mounted on the handlebar central member.

Conveniently, the connecting ring includes a first ring half section and a substantially symmetrical second ring half section, the first ring half section having a first fixing aperture extending therethrough, the first fixing aperture being chamfered at one of its ends so as to define a corresponding abutment shoulder, the second ring half section having a threaded second fixing aperture extending therethrough, the second fixing aperture being positioned so as to be substantially in register with the first fixing aperture when the first ring half section and the second ring half section are joined so as to form the connecting ting, a threaded ring screw having a screw head being inserted through the first fixing aperture with the screw head abutting against the abutment shoulder, the ring screw also being threadaly inserted in the second fixing aperture so as to keep the first ring half section and the second ring half section together.

Preferably, the driving mechanism includes a first chain and sprocket arrangement and a second chain and sprocket arrangement, the first chain and sprocket arrangement being mechanically coupled in series to the second chain and sprocket arrangement through a common intermediate axle, the first chain and sprocket arrangement being mechanically coupled to the pedal assembly, the second chain and sprocket arrangement being mechanically coupled to the rear wheel.

Conveniently, the frame includes a pedal crank sleeve rigidly fixed to the main tube front section in a substantially perpendicular relationship to the latter, an intermediate gear sleeve rigidly fixed to the main tube rear section in a substantially perpendicular relationship to the latter, the intermediate axle being journaled for rotation in the intermediate gear sleeve, the pedal assembly including a crank axle journaled for rotation in the pedal crank sleeve and a pair of foot pedals mounted on opposite sides of the crank axle by a corresponding pair of pedal cranks, the first chain and sprocket arrangement including a set of crank axle gear sprockets suitably connected to the crank axle for rotation therewith, a main intermediate gear sprocket suitably connected to the intermediate axle for rotation therewith, a first roller chain trained around one of the crank axle gear sprockets and the main intermediate gear sprocket for transmitting a torque force applied on the crank axle gear sprokets by the foot pedals to the main intermediate gear sprocket, the second chain and sprocket arrangement including a set of auxiliary intermediate gear sprockets suitably connected to the intermediate axle for rotation therewith, a set of rear wheel gear sprockets co-axially mounted on the rear wheel for rotation therewith, a second roller chain trained around one of the auxiliary intermediate gear sprockets and one of the rear wheel gear sprockets for transmitting a torque force applied on the auxiliary intermediate gear sprockets by the first chain and sprocket arrangement to the rear wheel.

Preferably, a front multi-speed derailleur mechanism is mounted on the frame adjacent the crank axle gear sprockets, an intermediate multi-speed derailleur mechanism is mounted on the frame adjacent the set of auxiliary intermediate gear sprockets and a rear multi-speed derailleur mechanism is mounted on the frame adjacent the set of rear wheel gear sprockets, the front multi-speed derailleur mechanism, the intermediate multi-speed derailleur mechanism and the rear multi-speed derailleur mechanism being connected through corresponding derailleur cables to corresponding gear control actuators located adjacent the handle assembly.

Conveniently, the seat is provided with a seat air bag for modifying the contour and consistency of the seat.

Preferably, a substantially elongated inflation tube extends outwardly from the seat air bag, the inflation tube being provided with an air valve.

Conveniently, the seat includes a backrest section, the backrest section being provided with an independent backrest inflatable air bag for modifying the contour and consistency of the backrest section.

Preferably, the seat further includes a headrest section extending integrally from the backrest section, the headrest section being provided with an independent headrest air bag for modifying the contour and consistency of the headrest section.

Conveniently, the seat further includes a bottom section, the bottom section being provided with an independent bottom section air bag for modifying the contour and consistency of the bottom section.

Preferably, the backrest section is pivotally connected to the frame and adjustably supported in a predetermined angular relationship with the latter by a substantially resilient backrest section supporting means.

Conveniently, the recumbent bicycle further comprises a pair of crash bars extending laterally from the main tube rear section adjacent the handle assembly, the crash bars being configured and sized so as to prevent the handle assembly from coming into contact with the ground surface when the recumbent bicycle is tilted sidewardly.

Preferably each of the crash bars has a substantially rectilinear section that extends outwardly from the main tube rear section and a crash bar curved section that extends integrally and substantially downwardly from the crash bar rectilinear section.

Conveniently, the recumbent bicycle further comprises a windshield mounted on the frame adjacent the frame front end.

Advantages of the present invention include the fact that the recumbent bicycle in accordance with the present invention can accommodate riders of various sizes by varying the length of the frame instead of using an oversized frame.

Another advantage of the present invention is that the bicycle is provided with relatively small wheels and is designed so as to minimize the wheel-to-wheel distance, as well as the overall length of the bicycle, thus facilitating the cornering of relatively tight curves.

Still another advantage of the present invention is that the bicycle can be adjusted to various sized riders without greatly affecting the overall weight distribution, geometry and steering "effect" of the bicycle.

A further advantage of the present invention relates to the fact that the recumbent bicycle is provided with a seat having a plurality of air cushions formed therein which can be adjusted to vary the contour, shape and size of various sections of the seat, thus providing a seat configuration that is customized to the specific configuration of rider's back.

A still further advantage of the present invention relates to the fact that the bicycle is configured so as to be readily assembled and disassembled, thus facilitating its transportation and storage.

A further advantage of the present invention relates to the fact that the bicycle is provided with a means for preventing damage to its structural components or to the user resulting from a sideward tilt that could occur for example during the cornering of a relatively tight curve.

A still further advantage of the present invention relates to the fact that a relatively high number of possible gear ratios is provided without affecting greatly the overall bulk or weight distribution of the bicycle, through the use of at least two gear sprocket and chain assemblies linked in series.

A further advantage of the present invention relates to the use of a frontwardly disposed windshield providing both an improved aerodynamical penetration coefficient and protection to the rider against environmental elements.

BRIEF DESCRIPTION OF THE DRAWINGS

An embodiment of the invention will now be described, by way of example, in reference to the following drawings in which:

FIG. 4: in a partial perspective view with sections taken out, illustrates portions of the frame and the steering mechanism part of the recumbent bicycle of FIG. 1;

FIG. 5: in a partially exploded view, illustrates portions of a linkage mechanism part of the recumbent bicycle of FIG. 1;

FIG. 12: in a rear perspective view with sections taken out, illustrates portions of a seat part of the recumbent bicycle of FIG. 1;

FIG. 13: in a partial rear perspective view with sections taken out, illustrates components part of the top portion of the seat of FIG. 12;

FIG. 14: in a partial rear perspective view with sections taken out, illustrates components part of the top portion of the seat of FIG. 12 with a covering sleeve being shown in phantom lines;

FIG. 15: in a partial rear view, illustrates various components part of the recumbent bicycle of FIG. 1 with the recumbent bicycle being in equilibrium in a substantially vertical position;

FIG. 16: in a partial rear view, illustrates various components part of the recumbent bicycle of FIG. 1 with the recumbent bicycle being in a substantially sidewardly inclined position;

FIG. 17: in a detailed view with sections taken out, illustrates the end portion of a crash bar part of the recumbent bicycle of FIG. 1;

FIG. 18: in a schematic side view, illustrates portions of the driving mechanism part of the recumbent bicycle of FIG. 1.

Similar references are used in different views to denote similar components.

DETAILED DESCRIPTION

Figure 1:
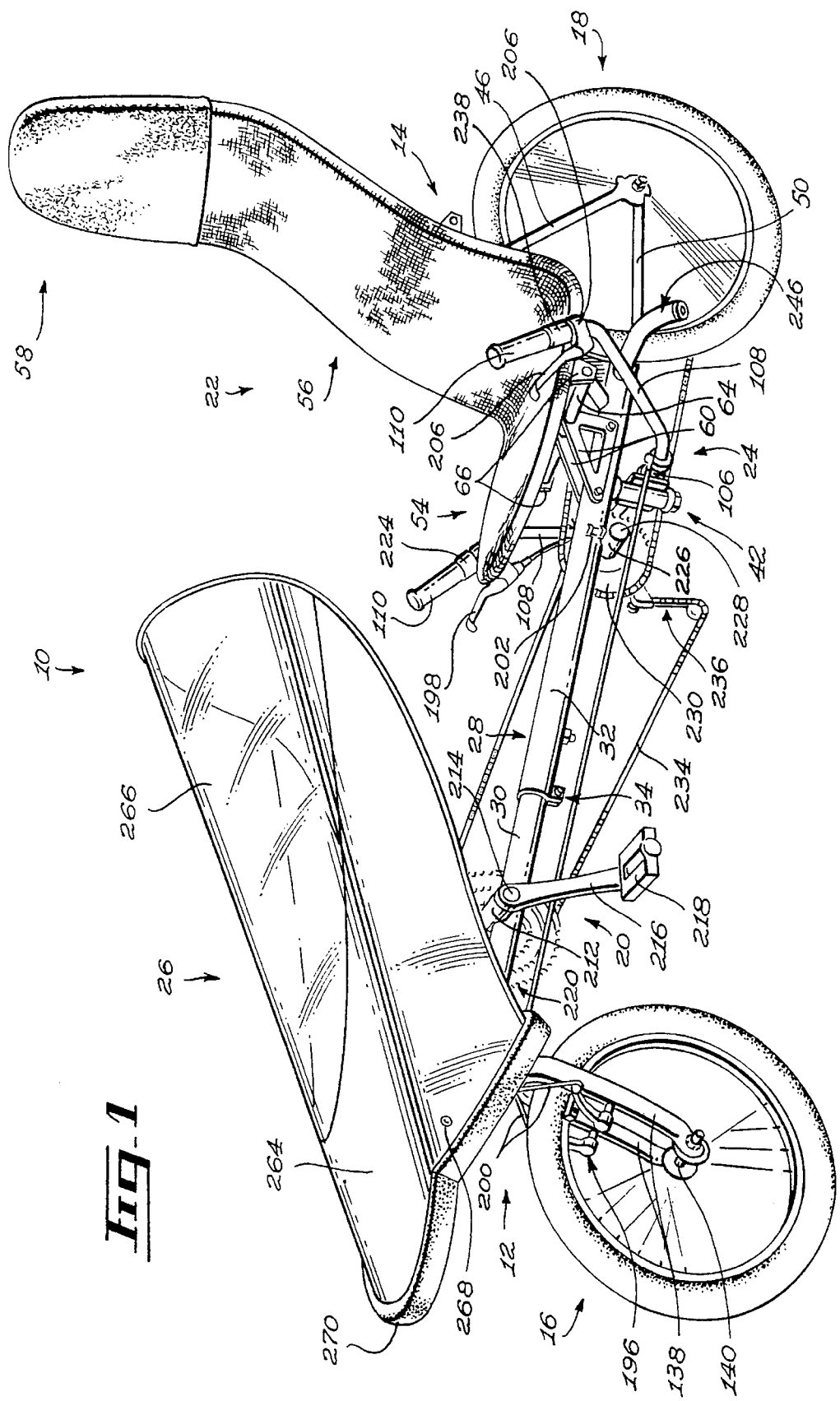
FIG. 1: in a perspective view, illustrates a recumbent bicycle in accordance with an embodiment of the present invention.

Referring to FIG. 1, there is shown a recumbent bicycle 10 in accordance with an embodiment of the present invention. The bicycle 10 has a vehicle longitudinal frame defining a frame front end 12 and a frame rear end 14.

A front wheel 16 and a rear wheel 18 support the vehicle frame, respectively adjacent the frame front end 12 and the frame rear end 14. A pedal assembly 20 is rotatably mounted on the vehicle frame adjacent the frame front end 12. The pedal assembly 20 is part of a drive means provided for driving the rear wheel 18. A seat assembly 22 is mounted adjacent the frame rear end 14. A steering control mechanism 24 is pivotally mounted on the vehicle frame adjacent the seat assembly 22. A windshield 26 is mounted on the vehicle frame so as to extend over the front section of the latter.

The vehicle frame includes a substantially elongated main tube 28 extending between the frame front end 12 and the frame rear end 14 in a generally horizontal orientation. The main tube 28 has a main tube front segment 30 that is telescopically inserted into a main tube rear segment 32 so as to allow the main tube 28 to be telescopically adjustable in length, as will be hereinafter described.

The main tube front segment 30 is selectively locked in a predetermined relationship relatively to the main tube rear segment 32 by a main tube releasable locking means 34. As illustrated more specifically in FIG. 4, the main tube locking means 34 includes a main tube longitudinal slot 36 formed in the frontward end of the main tube rear segment 32, a pair of main tube tightening flanges 38 formed in the slotted portion of the main tube rear segment 32 and a nut and bolt assembly 40.

The main tube tightening flanges 38 are both provided with an aperture extending therethrough. The nut and bolt assembly 40 is adapted to be used to vary the spacing between the main tube tightening flanges 38 so as to squeeze the main tube front segment 30, thus releasably locking the telescopic displacement of the main tube front segment 30 relatively to the main tube rear segment 32 in a conventional fashion.

Figure 2:
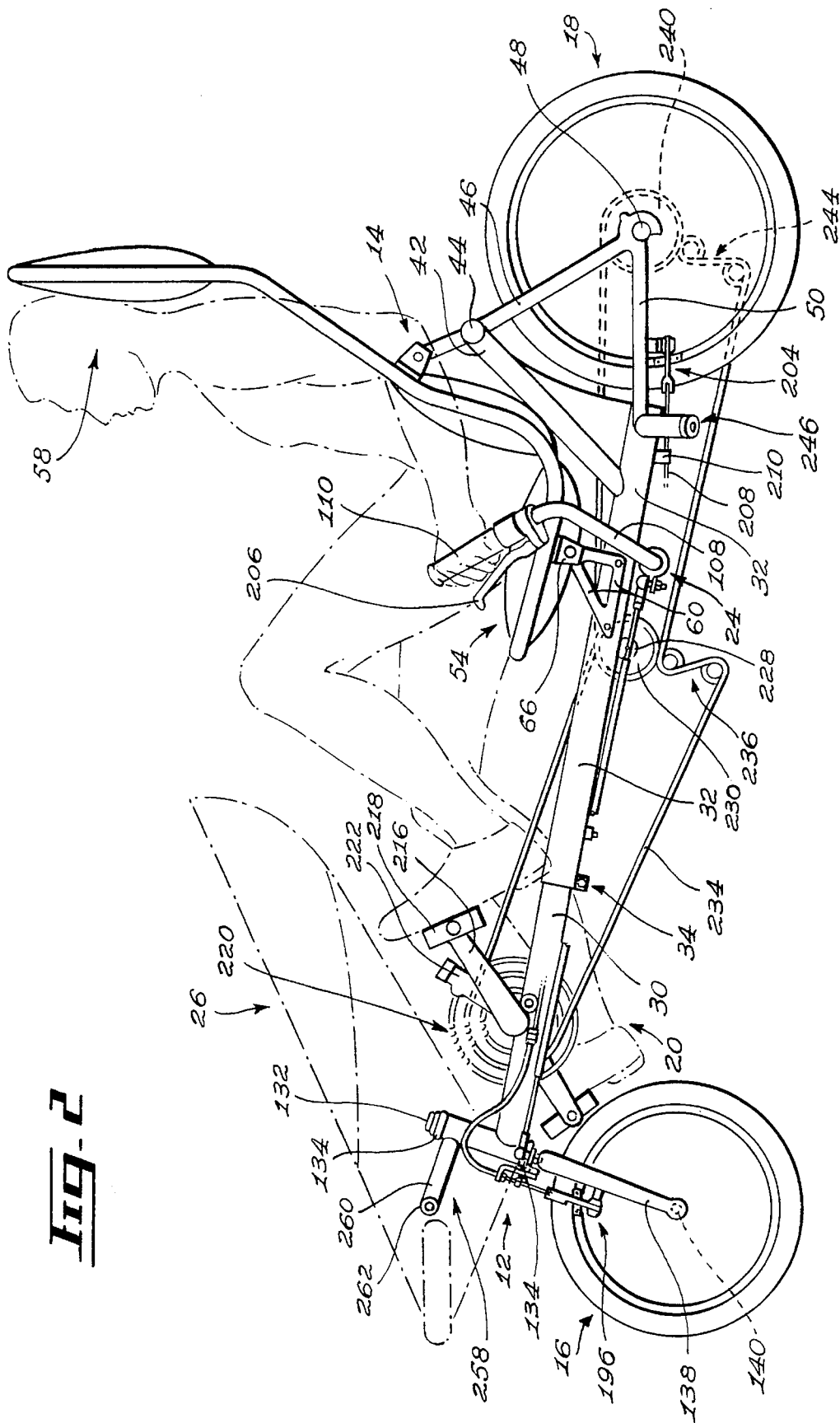
FIG. 2: in a side elevational view, illustrates the recumbent bicycle of FIG. 1 with sections of the bicycle and an intended user mounted on the bicycle, both being shown in phantom lines.

Referring now more specifically to FIG. 2, the vehicle frame includes a seat central tube 42. The seat central tube 42 extends substantially rearwardly and upwardly from the main tube rear segment 32 to a seat transversal tube 44. The seat transversal tube 44 extends in a substantially perpendicular direction relatively to the seat central tube 42.

A pair of seat stays 46, only one of which is seen in FIG. 2, extends substantially rearwardly and downwardly from the seat transversal tube 44 on opposite sides of the rear wheel 18 to a rear wheel axle 48 of the latter. A pair of chain stays 50, only one of which is seen in FIG. 2, extends substantially rearwardly from the main tube rear segment 32 on opposite sides of the rear wheel 18 to the rear wheel axle 48. A reinforcement plate 52 extends between a portion of the seat central tube 42 and the main tube rear segment 32.

The seat central tube 42, the seat stays 46 and the chain stays 50 form a pair of supporting structures having a substantially triangular configuration when seen from an elevational side view, as in FIG. 2. The supporting structures formed by the seat central tube 42, the seat stays 46 and the chain stays 50 are configured so as to connect respectively on opposite sides of the rear wheel axle 48, allowing the rear wheel 18 to rotate freely while supporting the rear portion of the vehicle frame.

Referring back to FIG. 1, the seat assembly 22 has a seat section 54, a backrest section 6 and a headrest section 58. The seat assembly 22 is pivotally fixed to the main tube rear segment 32 by a seat pivotal connection. The seat pivotal connection includes a pair of substantially triangular-shaped rear segment brackets 60 that is fixed to the main tube rear segment 32 adjacent the frame rear end 14 by seat brackets fastening bolts 62.

A seat first supporting tube 64 is rotatably fixed to the rear segment brackets 60. The seat first supporting tube 64 extends in a direction substantially parallel to the seat transversal tube 44. A pair of seat section brackets 66 is rigidly fixed to both the seat supporting tube 46 and the seat section 54.

Figure 10:
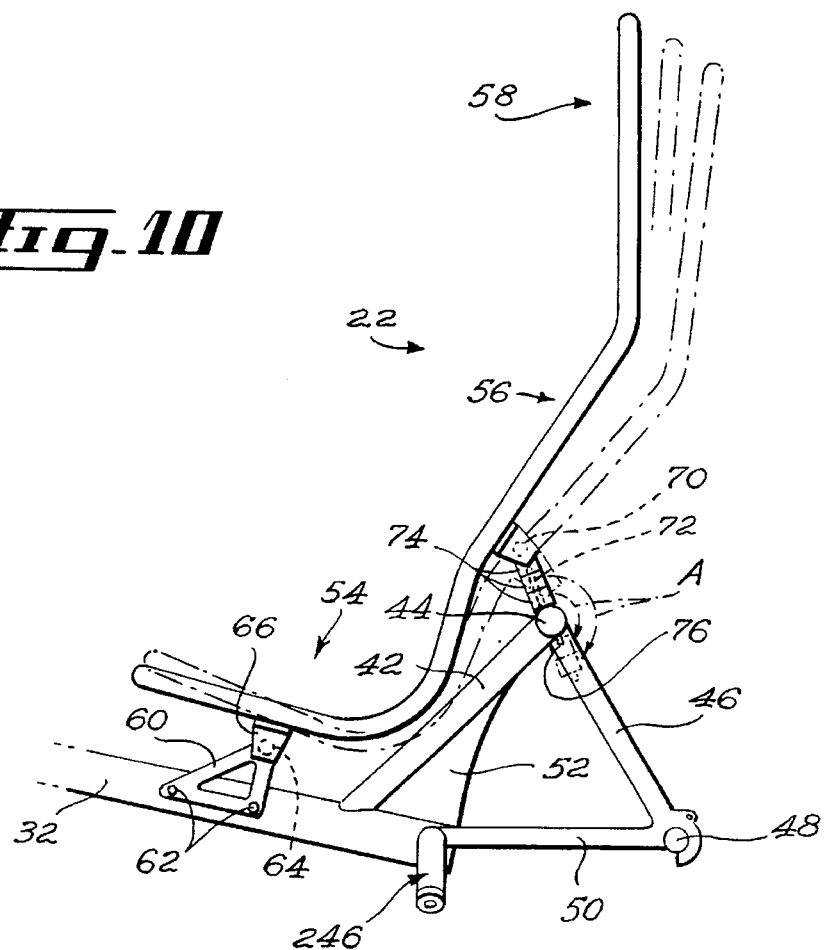
FIG. 10: in a partial side elevational view, illustrates a seat mounted to a portion of the frame part of the recumbent bicycle of FIG. 1, the seat being shown tilted rearwardly in phantom lines.

As illustrated in FIG. 10, in phantom lines, the seat assembly 22 is adapted to pivot relatively to the vehicle frame, about the seat first supporting tube 64, so as to ergonomically adapt to various body types and positions. A seat releasable locking means is adapted to lock the seat assembly 22 in a predetermined angular relationship relatively to the vehicle frame. The seat releasable locking means includes a pair of backrest brackets 68, only one of which is shown in FIG. 10, that is fixed to the backrest section 56.

A backrest tube 70 extends transversely across the backrest section 56 and is pivotally connected to both backrest brackets 68.

A pair of seat locking bolts 72, only one of which is shown in FIG. 10, is attached to the backrest tube 70. A set of seat spacing blocks 74, each having an aperture extending therethrough, is adapted to be slidably inserted on each of the seat locking bolts 72. The seat spacing blocks 74 mounted on the seat locking bolts 72 are adapted to form a corresponding pair of spacing columns, only one of which is shown in FIG. 10, that abuts against the seat transversal tube 44 and the backrest tube 70 so as to limit the rearward tilting movement of the seat assembly 22 about the seat first supporting tube 64.

Seat locking bolt protruding segments 76, defined as the segments of the seat locking bolts 72 that protrude from the spacing columns, are adapted to be slidably inserted in a corresponding pair of seat apertures that extends radially through the seat transversal tube 44.

The segments of the seat locking bolt protruding segments 76 that are inserted in the seat apertures are prevented from being pulled out of the corresponding seat aperture by a seat locking nut (not shown). The seat locking nut thus releasably limits the frontward tilting of the seat assembly 22 about the seat first supporting tube 64.

As illustrated in phantom lines in FIG. 10, in order to tilt the seat assembly 22 rearwardly, an intended user merely needs to remove one of the seat spacing blocks 74 from the segment of the seat locking bolts 72 located between the backrest tube 70 and the seat transversal tube 44.

To remove a seat spacing block 74, the intended user first removes the locking nut from the corresponding distal end of the seat locking bolt protruding segment 76. The intended user then pulls out the seat locking bolt protruding segments 76 out of the seat transversal tube 44. The seat spacing blocks 74 are then slidably removed and the seat locking bolt protruding segments 76 are slid back into the corresponding seat apertures extending through the seat transversal tube 44. The seat spacing blocks 74 which have been removed are then slidably positioned on the segment of the seat locking bolts 72 that protrudes underneath the seat transversal tube 44, as indicated by arrows A in FIG. 10. A locking nut is then threadaly placed back on each corresponding locking bolt 58. The hereinabove mentioned steps are reversed whenever the intended user wishes to tilt the seat assembly 22 frontwardly.

The seat spacing blocks 74 are preferably made of a relatively resilient material such as an elastomeric material and are thus adapted to act as a shock absorbing means between the backrest tube 70 and the seat transversal tube 44.

Figure 11:
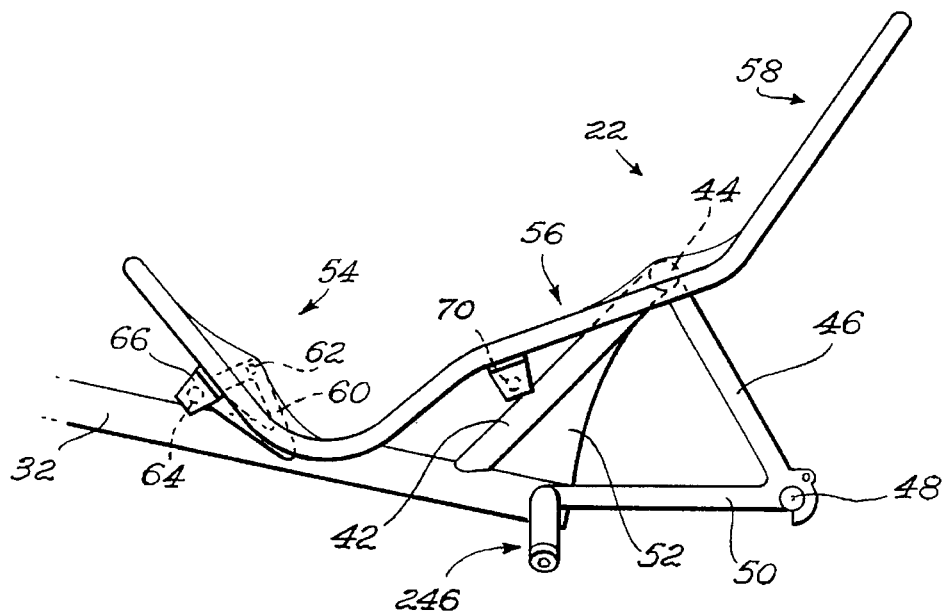
FIG. 11: in a partial side elevational view, illustrates a seat mounted to a portion of the frame part of the recumbent bicycle of FIG. 1, the seat being in a storage position.

FIG. 11 illustrates the seat assembly 22 in a so-called storage position wherein it occupies a minimal amount of space while still being attached to the vehicle frame. In order to move the seat assembly 22 from its operative position illustrated in FIG. 10 to its storage position illustrated in FIG. 11, the intended user first removes the locking nut from the corresponding distal end of the seat locking bolt protruding segment 76. The intended user then pulls out the seat locking bolt protruding segment 76 out of the seat transversal tube 44. The user also removes the rearwardmost seat bracket bolt 62 and then pivots the rear segment bracket 60 about the seat bracket bolt 62 that remains bolted through the main tube rear segment 32.

Referring now to FIGS. 12 through 14, the seat assembly 22 typically has a tubular peripheral frame 78 made of a substantially rigid material such as a light weight metallic alloy. The tubular peripheral frame 78 is configured so as to define ergonomic curves, especially in the lumbar region of the intended user, so as to provide a proper support.

A seat sleeve 80, preferably made of textile material, is wrapped around the tubular peripheral frame 78 so as to provide a doubled layered surface defining both the seat section 54 and the backrest section 56 of the seat assembly 22. The seat sleeve 80 is provided with a textile fastening means, such as a conventional zipper 82, to facilitate installation of the seat sleeve 80 around the tubular peripheral frame 78.

A seat section air cushion 84 and a back section air cushion 86 are both positioned inside the sleeve formed by the seat sleeve 80 respectively in the seat section 54 and the backrest section 56. A corresponding pair of inflation tubes 88 and 90 is hydraulically coupled respectively to the seat section air cushion 84 and the back section air cushion 86. The inflation tubes 88 and 90 are positioned so as to extend substantially upwardly through the seat sleeve 80 towards the headrest section 58.

A pair of respective tube valve means 92 and 94 is provided at the free end of the inflation tubes 88 and 90. The seat section air cushion 84 and the back section air cushion 86 are adapted to be filled with a gaseous fluid such as air so as to vary the consistency, thickness and contour of the seat section 54 and the backrest section 56.

As illustrated in FIG. 13, a head section cushion 96 is adapted to be positioned in the headrest section 58 of the seat assembly 22. The head section cushion 96 includes a pair of head section inflatable sections 98, only one of which is shown in FIG. 13. Each head section inflatable section 98 has a corresponding head section air valve 100. The head section inflatable sections 98 are connected together by an intermediate connecting section 102. The connecting section 102 is made of a substantially flexible material.

The connecting section 102 is adapted to be hanged on an upper transversal rod member part of the tubular peripheral frame 78. Again, the head section inflatable sections 98 are adapted to be filled with air so as to vary the consistency, thickness and contour of the headrest section 58.

As illustrated in FIG. 14, a head sleeve 104 is adapted to be slidingly positioned over the head section cushion 96. The head sleeve 104 is configured so as to snugly fit over the headrest section of the tubular peripheral frame 78.

Referring back to FIG. 1, the steering control mechanism 24 includes a handlebar central member 106. A pair of generally "L"-shaped handlebar outer members 108 extends integrally and outwardly from both ends of the handlebar central member 106. A cushioned handle sleeve 110 is positioned over the distal and generally upstanding section of each handlebar outer member 108.

The handlebar central member 106 is pivotally secured to the main tube rear segment 32 underneath the seat assembly 22 by a steering axle 112. The handle sleeve 110 is adapted to be grasped by the intended user in order to steer the bicycle 10, as will be hereinafter described.

Referring now more particularly to FIG. 4, the steering axle 112 includes an axle shaft extending substantially perpendicularly and downwardly from the main tube rear segment 32. The axle shaft is threaded at its axle shaft lower end 114. A steering sleeve 116 is pivotally mounted on the axle shaft. A pair of steering sleeve ring bearings 118 is preferably provided at both longitudinal ends of the steering sleeve 116. A screw thread ring 120 secures the steering sleeve 116 on the axle shaft. The steering sleeve 116 is thus adapted to pivot about a steering sleeve pivoting axis indicated by the reference character B.

A pair of fixing flanges 122 extends laterally from the steering sleeve 116 in a diametrically opposed relationship relatively to each other. Each fixing flange 122 is provided with a pair of fixing flange apertures extending therethrough.

A fixing collar 124 is mounted on the handlebar central member 106 on each side of the steering axle 112. Each fixing collar 124 is made of a pair of substantially symmetrical half sections that are fixed together by a pair of quick release means such as fixing collar Allen screws 126. The fixing collar Allen screws 126 are configured and sized so that their respective head sections protrude outwardly from one of the half sections making up the fixing collar 124. The fixing collar 124 is releasably fixed to a corresponding fixing flange 122 by securely inserting the protruding segment of the fixing collar Allen screws 126 through a corresponding fixing flange aperture with the heads of the fixing collar Allen screws 126 abutting against a corresponding fixing flange 122.

The fixing collars 124 and their corresponding fixing collar Allen screws 126 provide a quick release-type of mechanism that permits rapid adjustment of the position of the upstanding portion of the handlebar outer members 108 relative to the seat assembly 22. The fixing collars 124 and their corresponding fixing collar Allen screws 126 thus allow the intended user to optimize the position of the handlebar outer members 108 in relation to the seat assembly 22 as the seat assembly 22 is adjusted in its position relative to the pedal assembly 20. Further, the fixing collars 124 and their corresponding fixing collar Allen screws 126 permit the rapid disassembly of the steering control mechanism 24 for ease in the shipment of the bicycle 10. The rotation of the steering control mechanism 24 relatively to the vehicle frame by the intended user is transmitted to the front wheel 16 by a linkage mechanism 128 hereinafter described.

As shown generally in FIG. 2 and in greater detail in FIG. 4, the vehicle frame includes a head tube 130. The head tube 130 extends substantially upwardly from the frontward end of the main tube front segment 30. A front axle 132 is rotatably mounted inside the head tube 130 with a pair of conventional head tube ring bearings 134. The front axle 132 extends into a forked yoke 136. The yoke 136 defines a pair of forks 138.

The forks 138 are disposed on opposite sides of the front wheel 16. The distal ends of the forks 138 are secured to a front wheel axle 140 part of the front wheel 16 so as to allow the latter to rotate freely between the forks 138. The front wheel axle 140 is oriented so that the front wheel 16 is capable of turning with respect to the vehicle frame about a front wheel pivoting axis C extending generally through the plane of the front wheel 16 without interfering with the pedal assembly 20.

As mentioned previously, the linkage mechanism 128 is adapted to transfer the rotation of the steering sleeve 116 about the steering axis B into a rotation of the front wheel 16 about the front wheel pivoting axis C. The linkage mechanism 128 includes an elongated linkage rod 142. The linkage rod 142 extends in a substantially parallel relationship relatively to the main tube 28. The linkage rod 142 is secured at its front end to the yoke 136 and at its rear end to one of the handlebar outer members 108 part of the steering control mechanism 24.

As illustrated generally in FIG. 4 and more specifically in FIG. 5, the linkage rod 142 is pivotally connected to the handlebar central member 106 by a connecting ring 144. The connecting ring 144 includes a first ring half section 146 and a second ring half section 148. The first ring half section 146 has a pair of first fixing apertures 150 extending integrally into a corresponding pair of chamfers 152. The first fixing apertures 150 and the chamfers 152 define a corresponding pair of abutment shoulders 154.

The second ring half section 148 has a pair of threaded second fixing apertures 156 extending therethrough. The second fixing apertures 156 are positioned so as to be substantially in register with the first fixing apertures 150 when the second ring half section 148 and the first ring half section 146 form a full ring, as illustrated in FIG. 4. A pair of quick release fastening means, such as ring Allen screws 158, having a ring screw head 160 is adapted to be inserted into the second fixing apertures 156 with the ring screw head 160 abutting against the abutment shoulders 154 and to be threadaly inserted into the first fixing apertures 150 for keeping the connecting ring 144 and the first ring half section 146 together.

The second ring half section 148 and the first ring half section 146 cooperate to form a ring inner surface 162. The ring inner surface 162 is configured and sized so as to snugly fit around the handlebar central member 106 when the connecting ring 144 and the first ring half section 146 are secured together.

A rear rod bracket 164 extends integrally and outwardly from the second ring half section 148. The rear rod bracket 164 includes a rear bracket plate 166. The rear bracket plate 66 has a rear bracket plate aperture extending therethrough. A rear ball and socket-type connector 168 is fixed to the rear bracket plate 166. The rear ball and socket-type connector 168 includes a substantially hemispherically-shaped rear ball component 170.

A rear ball connecting stem 172 extends integrally and downwardly from the rear ball component 170. The rear ball connecting stem 172 includes a rear connecting stem abutment shoulder 174 and a rear connecting stem threaded segment 176. The rear connecting stem abutment shoulder 174 is adapted to abut against the rear bracket plate 166 when the rear connecting stem threaded segment 176 is inserted in the rear bracket plate aperture. A rear connecting stem locking nut 178 releasably secures the rear ball connecting stem 172 to the rear bracket plate 166.

A substantially dome-shaped rear socket component 180 is fittingly and rotatably positioned over the rear ball component 170. The rear ball component 170 and the rear socket component 180 are configured and sized so as to secure the rear ball component 170 to the rear socket component 180, while allowing the rear socket component 180 to rotate freely relatively to the rear ball component 170. An internally threaded rear connecting sleeve member 182 extends substantially frontwardly from the rear socket component 180.

Similarly, a substantially flat front bracket plate 184 extends integrally and substantially laterally from the yoke 136 adjacent the lowermost head tube ring bearing 134. The front bracket plate 186 has a flat front bracket plate aperture extending therethrough. A front ball and socket-type connector 168' is fixed to the front bracket plate 184. The front ball and socket-type connector 168' is substantially identical to the rear ball and socket-type connector 168. The front ball and socket-type connector 168' includes a substantially hemispherically-shaped front ball component (not shown).

A front ball connecting stem 172' extends integrally and downwardly from the rear ball component 170. The front ball connecting stem 172' includes a front connecting stem abutment shoulder 174' and a front connecting stem threaded segment 176'. The front connecting stem abutment shoulder 174' is adapted to abut against the front bracket plate 184, while the front connecting stem threaded segment 176' is inserted into the front bracket plate aperture.

A front connecting stem locking nut 178' releasably secures the front ball connecting stem 172' to the front bracket plate 184. A substantially dome-shaped front socket component 180' is fittingly and rotatably positioned over the rear ball component 170. The rear ball component 170 and the front socket component 180' are configured and sized so as to allow the rear socket component 180 freely about the rear ball component 170. An internally front connecting sleeve member 182' extends substantially rearwardly from the front socket component 180'.

The linkage rod 142 has a linkage rod central segment 186 and a pair of opposed linkage rod end segments 188 and 190. The linkage rod central segment 186 is provided with an internally threaded longitudinal channel at both ends thereof. The linkage rod end segments 188 and 190 are both provided with an external thread.

The linkage rod end segment 188 is threadably inserted into the front connecting sleeve member 182' and releasably locked to the front connecting sleeve member 182' by a front locking nut 192. The rear end of the linkage rod end segment 188 is threadably inserted into the frontward channel of the linkage rod central segment 186.

Conversely, the linkage rod end segment 190 is threadaly inserted into the rearward channel of the linkage rod central segment 186, while the rear end of the linkage rod end segment 190 is threadably inserted into the rear connecting sleeve member 182 and locked into the latter by a rear locking nut 194.

As indicated in FIG. 4 by arrows D, the linkage rod end segments 188 and 190 allow the linkage rod 142 to be adjusted in length so as to conform to the length adjustment of the vehicle frame indicated by the arrow E, as will be hereinafter described.

Since the front socket component 180' and the rear socket component 180 are both spaced respectively to the front wheel pivoting axis C and the steering axis B, motion of the linkage rod 142 along its longitudinal axis in one direction causes the front wheel 16 to turn in a first direction while motion of the linkage rod 142 in the opposite direction causes the front wheel 16 to turn in a second opposite direction. The linkage rod 142 being coupled to the steering control mechanism 24, the linkage rod 142 can be selectively moved along its axis in one of the two directions responsively to turning the steering control mechanism 24 about the steering axis B in a corresponding one of two directions.

The steering ratio of the bicycle 10 is defined as the amount of turning of the handlebar outer members 108 required to turn the front wheel 16.

As mentioned previously, one of the main characteristics of the present invention resides in the fact that the steering ratio can be readily adjusted, as will also be hereinafter described.

As illustrated generally in FIG. 1 and schematically in FIG. 18, the front wheel 16 is provided with a front caliper-type brake 196 that is adapted to be actuated by a front brake lever 198 positioned adjacent one of the handle sleeves 110 with a conventional flexible front brake cable 200. The front brake cable 200 runs along the main tube 28 for most of its length so as to safeguard the front brake cable 200 from damage caused by external impacts. The front brake cable 200 is maintained aligned with the main tube 28 by a front cable bracket 202.

As illustrated in FIG. 2, the rear wheel 18 is provided with a rear caliper-type brake 204. The caliper-type brake 204 is adapted to be actuated by a rear brake lever 206 through a rear brake cable 208. The rear brake cable 208 is maintained in a substantially aligned relationship with the main tube 28 by a rear cable bracket 210.

As illustrated in FIG. 1, a pedal crank sleeve 212 is rigidly fixed to the main tube front segment 30 in a substantially perpendicular relationship to the latter. The pedal assembly 20 includes a crank axle 212 that is journalled for rotation in the pedal crank sleeve 214. A pair of pedal cranks 216 is mounted at opposite ends of the crank axle 212. The pedal cranks 216 are each mounted at one end of the crank axle 214 so as to rotate with the latter and extend in a geometrically opposed relationship relatively to each other. The pedal cranks 216 support at their distal end a corresponding pair of foot pedals 218. A set of crank axle sprocket gears 220 is suitably connected to the crank axle 214 for rotation therewith.

A conventional front sprocket derailleur mechanism 222 is fixed to the main tube front segment 30 adjacent the set of crank axle sprocket gears 220 for allowing the intended user to shift between the gears of the set of crank axle sprocket gears 220. The front sprocket derailleur mechanism 222 is provided with a control cable (not shown) that runs along the main tube 28 to a corresponding first gear actuating ring 224 positioned adjacent one of the handle sleeves 110.

An intermediate gear sleeve 226 is fixed to the main tube rear segment 32 adjacent the steering axle 112. The intermediate gear sleeve 226 extends in a substantially perpendicular relationship with the main tube rear segment 32. An intermediate gear axle 228 is journalled for rotation in the intermediate gear sleeve 226. A main intermediate gear sprocket 230 is suitably connected to the intermediate gear axle 228 for rotation therewith. A set of auxiliary intermediate gear sprockets 232 is also suitably connected to the intermediate gear axle 228 for rotation therewith.

A first roller chain 224 is trained around both of the sprocket gears making up the set of crank axle sprocket gears 220 and one of the sprocket gears making up the main intermediate gear sprocket 230 for transmitting the torque imparted on the foot pedals 218 by the intended user to the intermediate gear axle 228.

An intermediate multi-speed derailleur mechanism 236 is mounted on the main tube rear segment 32 adjacent the set of auxiliary intermediate gear sprockets 232. The intermediate derailleur mechanism 236 is connected via a control cable (not shown) to an intermediate gear actuating ring 238 located adjacent one of the handle sleeves 110. The intermediate gear actuating ring 238 is thus adapted to allow the intended user to choose between one of the gear sprockets part of the set of auxiliary intermediate gear sprockets 232. The first gear actuating ring 224 and the intermediate gear actuating ring 238 are thus adapted to allow the intended user to select between a plurality of gear reduction ratios between the set of crank axle sprocket gears 220 and the set of auxiliary intermediate gear sprockets 232.

The rear wheel 18 is provided with a set of co-axially driven rear wheel gear sprockets 240. A second roller chain 242 is trained around both the main intermediate gear sprocket 230 and one of the gear sprockets part of the intermediate gear actuating ring 238. The second roller chain 242 is thus adapted to transmit the torque imparted on the main intermediate gear sprocket 230 by the intermediate gear axle 228 to the intermediate gear actuating ring 238.

A rear wheel derailleur mechanism 244 is mounted on the rear wheel axle 48 adjacent the rear wheel sprockets 240. The rear wheel derailleur mechanism 244 is connected through a third control cable (not shown) to a third gear actuating ring (also not shown) so as to allow the intended user to select one of the gear sprockets part of the intermediate gear actuating ring 238. The intended user is thus also allowed to choose a second gear ratio between the main intermediate gear sprocket 230 and the intermediate gear actuating ring 238.

The use of two roller chains, namely the first roller chain 234 and the second roller chain 242 connected in series through the intermediate gear axle 228 and the use of three derailleur mechanisms, namely the front sprocket derailleur mechanism 222, the intermediate derailleur mechanism 236 and the rear wheel derailleur mechanism 244 allow for a possibility of having a large number of possible gear ratios while minimizing the volume occupied by the gear sprocket arrangement and their corresponding derailleurs and while also better distributing the weight along the entire length of the vehicle frame.

Indeed, instead of having a single derailleur mechanism occupying a relatively large space and creating a punctual mass, the use of three derailleur systems and three corresponding sprocket arrangements distributes the weight along the entire length of the vehicle frame, while minimizing the space occupied by the derailleur systems. The use of three derailleur mechanisms also minimizes the lateral travel of the derailleur mechanism components and thus also minimizes the risk of mechanical failure.

The use of a relative large number of possible gear ratios is particularly important since both the front wheel 16 and the rear wheel 18 preferably have a relatively small diameter. The relatively large number of possible gear ratios thus enables the intended user to compensate for the increased friction resistance caused by the relatively small diameter of the front wheel 16 and the rear wheel 18.

As illustrated generally in FIG. 1 and in greater detail in FIGS. 15 through 17, a pair of crash bars 246 extends laterally from the main tube rear segment 32 adjacent the seat assembly 22. The crash bars 246 preferably extend in a substantially perpendicular relationship relatively to the main tube rear segment 32 and thus in a diametrically opposed relationship relatively to each other. Each crash bar 246 has a substantially rectilinear crash bar segment 248 that extends from the main tube rear segment 32 and an integrally extending distal segment 250 that bends substantially downwardly relatively to the adjacent crash bar rectilinear segment 248.

A crash bar abutment disk 252 is fixed to the distal end of each crash bar distal segment 250. As illustrated in FIG. 17, the crash bar abutment disks 252 are preferably fixed to the distal end of the crash bar distal segment 250 with the use of a spreader component 254 having lateral flanges adapted to spread outwardly as a spreading screw 256 is threadaly inserted therein.

As illustrated in FIG. 16, the crash bars 246 are adapted to limit the side tilting of the bicycle 10 so as to protect both the components of the bicycle 10 and the hands of the intended user as the intended user tilts the bicycle 10, for example during a turning operation in a curve. The crash bars 246 are again particularly important since both the front wheel 16 and the rear wheel 18 have a particularly small diameter and since the vehicle frame is thus relatively close to a ground surface G on which the bicycle 10 is resting.

As illustrated in FIG. 2, a substantially "T"-shaped windshield bracket 258 is fixed to the head tube 130. The windshield bracket 258 includes a windshield bracket front spacing tube 260 that extends substantially perpendicularly and frontwardly from the head tube 130 and a pair of windshield bracket lateral fixing tubes 262 that extends substantially perpendicularly from the distal end of the windshield bracket front spacing tube 260.

The windshield 26 has a substantially elongated general configuration and a substantially arcuate cross-sectional configuration. As illustrated more clearly in FIG. 1, the windshield 26 has a substantially translucent peripheral section 264 and a transparent section 266. A pair of windshield fixing apertures extends on each side of the windshield translucent section 264. The windshield 26 is pivotally fixed to the windshield bracket 258 by a pair of windshield fixing pins 268 that are inserted through the windshield fixing apertures and rotatably fixed to the windshield bracket lateral fixing tubes 262.

The windshield 26 is thus adapted to pivot about the windshield fixing tubes 220 so as to adjust to the morphology of the intended user. The windshield 26 is configured so as to reduce the penetration coefficient of the vehicle 10 and thus to increase the aerodynamical characteristics of the latter.

The windshield 26 is preferably made of a polymeric resin preventing ultraviolet filtering characteristics. A windshield bumper lining 270 is fixed to the frontwardmost peripheral edge of the windshield 26. The windshield bumper lining 270 is preferably made of a strip of a substantially resilient material such as an elastomeric resin.

Figure 3:
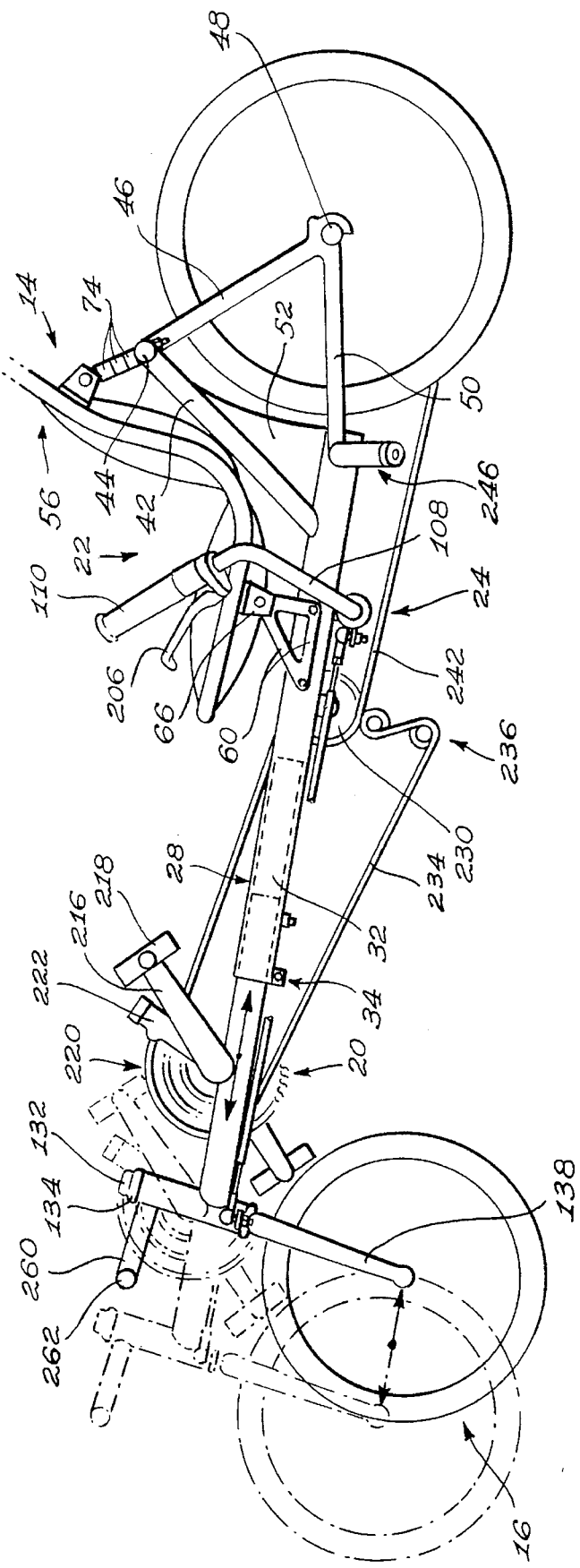
FIG. 3: in a partial side elevational view with sections taken out, illustrates the frame of the bicycle of FIG. 1 being adjusted in length.

In use, as illustrated more specifically in FIG. 3, the length of the vehicle frame is adapted to be adjusted by telescopically moving the main tube front segment 30 and the main tube rear segment 32 relatively to one another along their longitudinal axis.

As mentioned previously, one of the main drawbacks associated with the prior art recumbent-type bicycle is that the adjustment of the distance between the seat and the pedal assembly is made through movement of the seat relatively to the vehicle frame. Consequently, manufacturers have resorted to constructing recumbent bicycles having a generally long frame so as to accommodate users of different sizes and particularly so as to be able to also accommodate relatively tall persons requiring a relatively long seat-to-pedal distance. The relatively long frame of the prior art recumbent-type bicycle in turn is at least partially responsible for the difficulty of using prior art recumbent-type bicycles in relatively tight curves. Since these curves are relatively frequent especially in urban areas, the prior art recumbent bicycles have proven to be relatively unsatisfactory.

Figure 9:
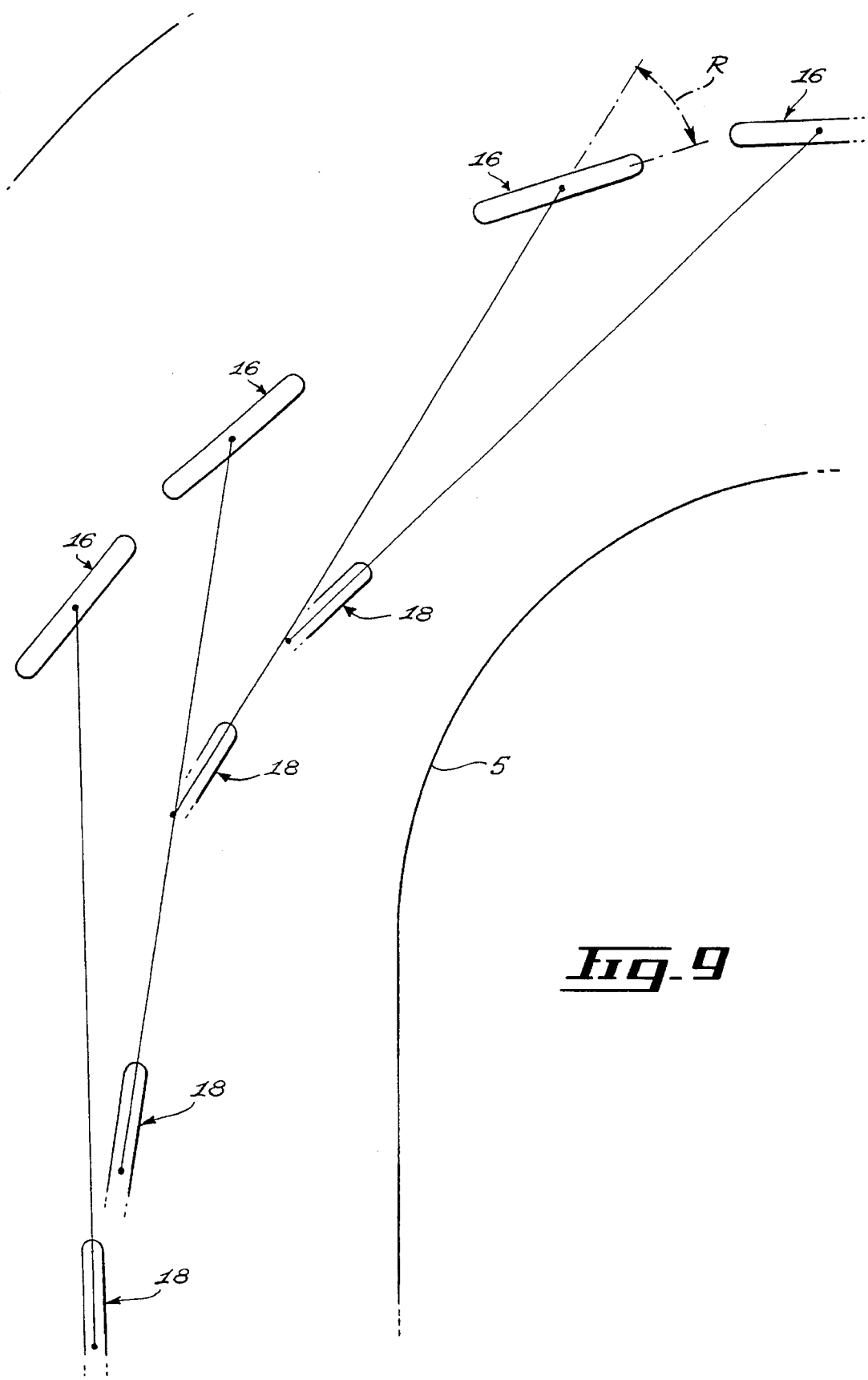
FIG. 9: in a top schematic view, illustrates the position taken by the wheels and the frame of a recumbent bicycle such as the one described in FIG. 1 when the latter is turning in a substantially tight curve.

FIG. 9 illustrates schematically the trajectory of the wheels 16 and 18 and frame of a recumbent bicycle at it is driven through a relatively tight curve S. During the cornering of a typical curve S, the front wheel 16 can only be pivoted through a given angle R relatively to the longitudinal axis of the frame without affecting the balance of the bicycle 10. The distance between the front wheel 16 and the rear wheel 18 thus influences greatly the cornering characteristics of a given bicycle. As mentioned previously, one of the main drawbacks associated with prior art recumbent bicycles is that their inherent structural configuration caused the distance between the front and rear wheels to be detrimental to the cornering characteristics of the bicycle.

The bicycle 10 in accordance with the present invention proposes a structure wherein a great effort has been taken to minimize the overall length of the vehicle 10, for example by using a length adjustable frame and by using a relatively small front wheel 16 as well as a small rear wheel 18. The relatively small diameter of the front wheel 16 and the rear wheel 18 not only improves the road handling characteristics of the bicycle 10 and especially the capacity of the bicycle 10 to negotiate relatively tight curves, but also facilitates the mounting of the intended user on the seat assembly 22 as well as the dismounting of the intended user from the seat assembly 22.

Referring back to FIG. 3, it can be seen that when the distance between the pedal assembly 20 and the seat assembly 22 is reduced to accommodate a smaller person, the length of the frame is similarly reduced, which is beneficial to the road handling capacities of the bicycle 10.

Figure 6:
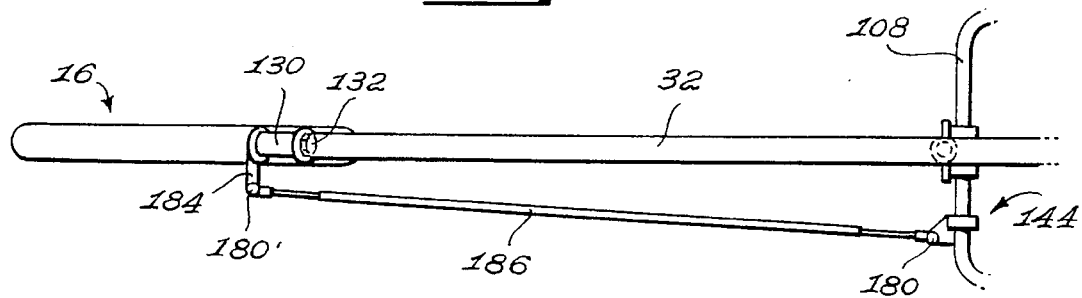
FIG. 6: in a partial schematic top view, illustrates portions of the recumbent bicycle of FIG. 1 having its front wheel in a substantially aligned relationship with the frame and the linkage rod in an intermediate position.
Figure 7:
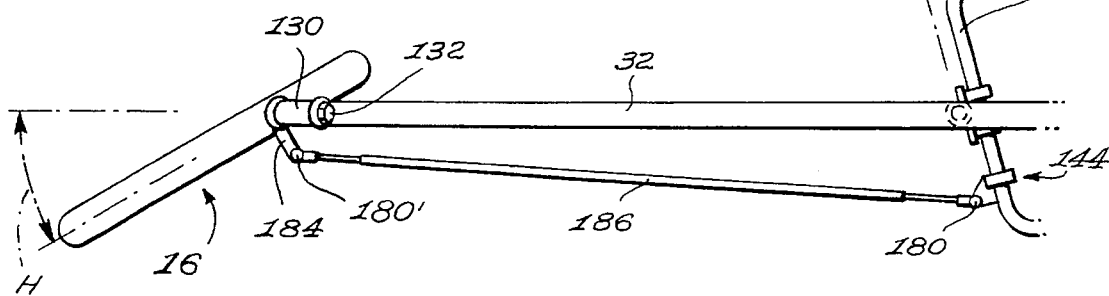
FIG. 7: in a partial schematic top view, illustrates portions of the recumbent bicycle of FIG. 1 having its front wheel in a substantially pivoted relationship with the frame and the linkage rod in a substantially intermediate position.
Figure 8:
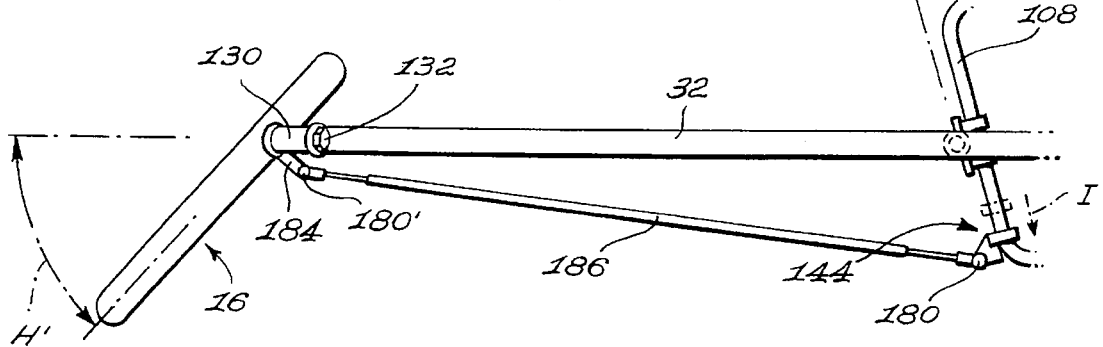
FIG. 8: in a partial schematic top view, illustrates portions of the recumbent bicycle of FIG. 1 having its front wheel in a substantially pivoted relationship with the frame and the linkage rod in a substantially distant relationship relatively to the steering axis.

As mentioned previously and as illustrated more specifically in FIGS. 6 through 8, the steering ratio corresponding to the amount of turning of the steering control mechanism 24 required to turn the front wheel 16 can be readily adjusted. The steering ratio is adjusted by slidably positioning the connecting ring 144 along the corresponding handlebar central member 106. The connecting ring 144 can be readily re-positioned by loosening the ring screws 158, sliding the connecting ring 144 to a suitable position and then re-tightening the ring screws 158. The slidable action along the corresponding handlebar central member 106 allows for a fine tuned positioning of the connecting ring 144.

FIGS. 7 and 8 illustrate the relationship between the positioning of the connectin ring 144 and the steering ratio. In FIG. 7, the handlebar central member 106 part of the steering control mechanism 24 is pivoted about the steering axis B by an angle indicated by the reference character F. The pivoting movement of the steering control mechanism 24 is transmitted to the front wheel 16 by the linkage rod 142 and causes a rotation of the front wheel 16 about the front wheel pivoting axis C indicated by the reference character H.

In FIG. 8, the connecting ring 144 has been slidably moved on the handlebar central member 108 away from the steering axis B, as indicated by the reference character I. The resulting effect is that a rotation of the handlebar central member 106 about the steering axis B, of the same magnitude as the rotation indicated by the reference character F in FIG. 7, causes the wheel 16 to be rotated about the front wheel pivoting axis C through an angle H' having a greater magnitude than the angle H. In other words, the positioning of the connecting ring 144 on the handlebar central member 106 influences the steering ratio. The closer the connecting ring 144 is to the steering axis B, the less sensitive the steering is, that is the greater the steering control mechanism 24 must be turned about the steering axis B in order to turn the front wheel 16 a specified amount. Conversely, the farther the connecting ring 144 is from the steering axis B, the more sensitive the steering is, in other words, the steering control mechanism 24 must only be turned slightly in order to turn the front wheel 16 a specified amount.

Whenever the intended user modifies the length of the main tube 28, he can thus readily modify the steering ratio so as to adapt the steering ratio to the new length of the bicycle 10. The steering control mechanism can also be readily adjusted so as to conform to the new bicycle length. Also, when the main tube front segment 30 is moved relatively to the main tube rear segment 32 so as to adjust the length of the main tube 28, the intended user may vary the length of the first roller chain 234 so as to adjust the tension in the latter by modifying the number of chain links making up the first roller chain 234 or by adjusting the tension in the intermediate derailleur mechanism 236.

The bicycle 10 thus provides a structure which can be readily customized to the length of the intended user without affecting considerably the roadling capacities of the vehicle and without any substantial detrimental effect to the ergonomic characteristics of the vehicle.

Numerous modifications, variations and alterations may be made to the specific embodiment of the invention hereinabove described without departing from the scope of the invention as defined in the claims.

The embodiments of the invention in which an exclusive privilege or property is claimed are defined as follows:

1. A recumbent bicycle comprising:

a substantially elongated frame defining a frame longitudinal axis, a frame front end and a frame rear end, said frame including a main tube, said main tube having a main tube front section and a main tube rear section, said main tube front section and said main tube rear section being movable relatively to one another along said frame longitudinal axis so as to vary the length of said frame;

a forked yoke pivotally fixed to said main tube front section for pivoting about a yoke pivoting axis;

a front wheel rotatably mounted on said yoke for rotating about a front wheel rotating axis;

a rear wheel rotatably fixed to said frame adjacent said frame rear end for rotating about a rear wheel rotating axis;

a driving mechanism for driving said rear wheel, said driving mechanism including a pedal assembly, said pedal assembly being mounted on said main tube front section adjacent said frame front end;

a seat mounted on said main tube rear section adjacent said frame rear end;

a handle assembly pivotally mounted on said main tube rear section adjacent said seat;

a linkage means for transmitting the rotation of said handle assembly to said yoke, said linkage means being operatively attached to both said handle assembly and said yoke;

a brake means mounted on said frame for braking said bicycle.

2. A recumbent bicycle as recited in claim 1 wherein said handle assembly includes a handlebar central member pivotally fixed to said main tube rear section in a substantially perpendicular relationship with the latter for rotation about a generally vertically extending steering axis, said linkage means including a substantially elongated linkage rod, said linkage rod having a linkage rod first end and a linkage rod second end, said linkage rod first end being pivotally attached to said yoke by a linkage rod first connecting means, said linkage rod second end being pivotally attached to said handlebar central member by a linkage rod second connecting means, said linkage rod second connecting means being movable along said handlebar central member so as to vary the amount of turning of the handle assembly required to pivot said front wheel about said yoke pivoting axis.

3. A recumbent bicycle as recited in claim 2 wherein said linkage rod first connecting means includes a front ball and socket-type of joint and said linkage rod second connecting means includes a rear ball and socket-type of joint.

4. A recumbent bicycle as recited in claim 2 wherein said linkage rod second connecting means includes a connecting ring being slidably mounted on said handlebar central member.

5. A recumbent bicycle as recited in claim 4 wherein said connecting ring includes a first ring half section and a substantially symmetrical second ring half section, said first ring half section having a first fixing aperture extending therethrough, said first fixing aperture being chamfered at one end so as to define a corresponding abutment shoulder, said second ring half section having a threaded second fixing aperture extending therethrough, said second fixing aperture being positioned so as to be substantially in register with said first fixing aperture when said first ring half section and said second ring half section are joined so as to form said connecting ring, a threaded ring screw having a screw head being inserted through said first fixing aperture with said screw head abutting against said abutment shoulder, said ring screw also being threadably inserted in said second fixing aperture so as to keep said first ring half section and said second ring half section together.

6. A recumbent bicycle as recited in claim 1 wherein said driving mechanism includes a first chain and sprocket arrangement and a second chain and sprocket arrangement, said first chain and sprocket arrangement being mechanically coupled in series to said second chain and sprocket arrangement through a common intermediate axle, said first chain and sprocket arrangement being mechanically coupled to said pedal assembly, said second chain and sprocket arrangement being mechanically coupled to said rear wheel.

7. A recumbent bicycle as recited in claim 6 wherein said frame includes
- a pedal crank sleeve rigidly fixed to said main tube front section in a substantially perpendicular relationship to the latter;
- an intermediate gear sleeve rigidly fixed to said main tube rear section in a substantially perpendicular relationship to the latter, said intermediate axle being mounted for rotation in said intermediate gear sleeve;

said pedal assembly including
- a crank axle journaled for rotation in said pedal crank sleeve and a pair of foot pedals mounted on opposite sides of said crank axle by a corresponding pair of pedal cranks;

said first chain and sprocket arrangement including
- a set of crank axle gear sprockets suitably connected to said crank axle for rotation therewith;
- a main intermediate gear sprocket suitably connected to said intermediate axle for rotation therewith;
- a first roller chain trained around one of said crank axle gear sprockets and said main intermediate gear sprocket for transmitting a torque force applied on said crank axle gear sprokets by said foot pedals to said main intermediate gear sprocket;

said second chain and sprocket arrangement including
- a set of auxiliary intermediate gear sprockets suitably connected to said intermediate axle for rotation therewith;
- a set of rear wheel gear sprockets co-axially mounted on said rear wheel for rotation therewith;
- a second roller chain trained around one of said auxiliary intermediate gear sprockets and one of said rear wheel gear sprockets for transmitting a torque force applied on said auxiliary intermediate gear sprockets by said first chain and sprocket arrangement to said rear wheel.

8. A recumbent bicycle as recited in claim 7 wherein a front multi-speed derailleur mechanism is mounted on said frame adjacent said crank axle gear sprockets, an intermediate multi-speed derailleur mechanism is mounted on said frame adjacent said set of auxiliary intermediate gear sprockets and a rear multi-speed derailleur mechanism is mounted on said frame adjacent said set of rear wheel gear sprockets, said front multi-speed derailleur mechanism, said intermediate multi-speed derailleur mechanism and said rear multi-speed derailleur mechanism being connected through corresponding derailleur cables to corresponding gear control actuators located adjacent said handle assembly.

9. A recumbent bicycle as recited in claim 1 wherein said seat is provided with a seat air bag for modifying the contour and consistency of said seat.

10. A recumbent bicycle as recited in claim 9 wherein a substantially elongated inflation tube extends outwardly from said seat air bag, said inflation tube being provided with an air valve.

11. A recumbent bicycle as recited in claim 9 wherein said seat includes a backrest section, said backrest section being provided with an independent backrest inflatable air bag for modifying the contour and consistency of said backrest section.

12. A recumbent bicycle as recited in claim 9 wherein said seat further includes a headrest section extending integrally from said backrest section, said headrest section being provided with an independent headrest air bag for modifying the contour and consistency of said headrest section.

13. A recumbent bicycle as recited in claim 9 wherein said seat further includes a bottom section, said bottom section being provided with an independent bottom section air bag for modifying the contour and consistency of said bottom section.

14. A recumbent bicycle as recited in claim 11 wherein said backrest section is pivotally connected to said frame and adjustably supported in a predetermined angular relationship with the latter by a substantially resilient backrest section supporting means.

15. A recumbent bicycle as recited in claim 1 further comprising a pair of crash bars extending laterally from said main tube rear section adjacent said handle assembly, said crash bars being configured and sized so as to prevent said handle assembly from coming into contact with the ground surface when said recumbent bicycle is tilted sidewardly.

16. A recumbent bicycle as recited in claim 15 wherein each of said crash bars has a substantially rectilinear section that extends outwardly from said main tube rear section and a crash bar curved section that extends integrally and substantially downwardly from said crash bar rectilinear section.

17. A recumbent bicycle as recited in claim 1 further comprising a windshield mounted on said frame adjacent said frame front end.

18. A recumbent bicycle as recited in claim 17 wherein said windshield has a windshield peripheral edge and wherein a frontward section of said windshield peripheral edge is provided with a substantially resilient bumper structure.

19. A recumbent bicycle as recited in claim 2 wherein said handlebar central member has a handlebar central member longitudinal axis and wherein said handle assembly further includes
- an axle shaft extending substantially perpendicularly and downwardly from said main tube rear segment along a steering axis,
- a steering sleeve rotatably mounted on said axle shaft for rotation about said steering axis;
- a pair of fixing flanges extending laterally from said steering sleeve in a substantially diametrically opposed relationship relatively to each other;
- a fixing collar releasably mounted on said handlebar central member on each side of said axel shaft, said fixing collars being releasably fixed to said fixing flanges, said fixing collars being configured so as to allow said handlebar central member to be selectively rotated about said handlebar central member longitudinal axis.

* * * * *